United States Patent
Oizumi

(10) Patent No.: US 11,173,751 B2
(45) Date of Patent: Nov. 16, 2021

(54) PNEUMATIC TIRE

(71) Applicant: The Yokohama Rubber Co., LTD., Tokyo (JP)

(72) Inventor: Naoya Oizumi, Hiratsuka (JP)

(73) Assignee: The Yokohama Rubber Co., LTD.

( * ) Notice: Subject to any disclaimer, the term of this patent is extended or adjusted under 35 U.S.C. 154(b) by 0 days.

(21) Appl. No.: 17/257,525

(22) PCT Filed: Apr. 17, 2019

(86) PCT No.: PCT/JP2019/016515
§ 371 (c)(1),
(2) Date: Dec. 31, 2020

(87) PCT Pub. No.: WO2020/008700
PCT Pub. Date: Jan. 9, 2020

(65) Prior Publication Data
US 2021/0162818 A1 Jun. 3, 2021

(30) Foreign Application Priority Data
Jul. 2, 2018 (JP) .............................. JP2018-126073

(51) Int. Cl.
*B60C 13/00* (2006.01)
(52) U.S. Cl.
CPC .................................. *B60C 13/001* (2013.01)
(58) Field of Classification Search
CPC ....... B60C 13/00; B60C 13/001; B60C 13/02; B60C 19/003
(Continued)

(56) References Cited

U.S. PATENT DOCUMENTS 3,786,850 A * 1/1974 Turoczi, Jr. .......... B60C 19/003
152/154.1
2008/0087362 A1 4/2008 Metz
(Continued)

FOREIGN PATENT DOCUMENTS

DE  10 2012 108 455   3/2014
JP       3043519       11/1997
(Continued)

OTHER PUBLICATIONS

English machine translation of WO2020/008701. (Year: 2020).*
International Search Report for International Application No. PCT/JP2019/016515 dated Jul. 16, 2019, 4 pages, Japan.

*Primary Examiner* — Robert C Dye
(74) *Attorney, Agent, or Firm* — Thorpe North & Western

(57) ABSTRACT

Regions on an outer side, in a radial direction, of maximum width positions of outer surfaces of sidewall portions of a pneumatic tire have indications formed as protrusion portions protruding from the outer surface of a corresponding one of the side wall portions by 0.8 mm or more and depicting an alphanumeric, a pattern, or a symbol, the number of indications being N, an angle θ between one end and another end of each of the indications in the circumferential direction about a tire axis satisfies 30°≤θ≤150°, the indications are arranged in the sidewall portions at an interval of (360°/N)±20°, and the indications in one of the sidewall portions on one side and the indications in the other one of the sidewall portions are positioned shifted from each other in the circumferential direction, with a shift angle about the tire axis between the indications being in a range of (180°/N)±20°.

8 Claims, 5 Drawing Sheets

(58) Field of Classification Search
USPC .......................................................... D12/605
See application file for complete search history.

(56) References Cited

U.S. PATENT DOCUMENTS

| | | | |
|---|---|---|---|
| 2010/0018624 | A1 | 1/2010 | Miyasaka |
| 2014/0352864 | A1 | 12/2014 | Miyasaka et al. |
| 2015/0000811 | A1* | 1/2015 | Kurita ....................... B60C 3/04 |
| | | | 152/454 |
| 2015/0290981 | A1 | 10/2015 | Berger et al. |
| 2020/0324580 | A1 | 10/2020 | Takemori |

FOREIGN PATENT DOCUMENTS

| | | |
|---|---|---|
| JP | 2012-006171 | 1/2012 |
| JP | 2015-042535 | 3/2015 |
| JP | 2016-501149 | 1/2016 |
| JP | 6210127 | 10/2017 |
| WO | WO 2006/015674 | 2/2006 |
| WO | WO 2008/075544 | 6/2008 |
| WO | WO 2013/125165 | 8/2013 |
| WO | WO 2014/072161 | 5/2014 |
| WO | WO 2015/029927 | 3/2015 |
| WO | WO 2017/204308 | 11/2017 |
| WO | WO2020/008701 * | 1/2020 |

* cited by examiner

PNEUMATIC TIRE

TECHNICAL FIELD

The present technology relates to a pneumatic tire provided with an indication formed by protrusion portions protruding from an outer surface of a sidewall portion, and particularly relates to a pneumatic tire with which degradation of uniformity and vibration during traveling related to the indication can be suppressed.

BACKGROUND ART

For example, some pneumatic tires have an outer surface of a sidewall portion provided with an indication for displaying a manufacturer logo, a model name, or the like (see, for example, Japan Patent No. 6210127). Such an indication is, for example, formed by protrusion portions and recess portions protruding and recessing relative to a reference surface of the outer surface of the sidewall portion. Top and bottom surfaces of the protrusion portions and recess portions depict alphanumerics, patterns, and symbols that, in combination, represent a manufacturer logo, a model name, or the like.

When the indication is formed by protrusion portions in particular, a rubber amount is likely to differ between a portion provided with the indication formed by a group of protrusion portions and a portion provided with no indication. The indications are generally each provided in both of a pair of sidewall portions. In this context, the difference in the rubber amount described above becomes even larger when the sidewall portion on one side and the sidewall portion on the other side have the positions of the indications on the tire circumference overlapping each other. Such a difference in the rubber amount may affect the uniformity of the tire and vibration during traveling. In view of this, there has been a demand for a measure for suppressing degradation of the uniformity as well as the vibration during traveling related to the indications, through optimization of the shape and the arrangement of indications.

SUMMARY

The present technology provides a pneumatic tire with which degradation of uniformity as well as vibration during traveling related to an indication formed by protrusion portions protruding from an outer surface of a sidewall portion can be suppressed.

A pneumatic tire according to the present technology includes a tread portion extending in a tire circumferential direction to form an annular shape, a pair of sidewall portions provided on both sides of the tread portion, and a pair of bead portions provided on an inner side of the sidewall portions in a tire radial direction, in which regions disposed on an outer side, in the tire radial direction, of tire maximum width positions of outer surfaces of the pair of sidewall portions are provided with indications each formed as a group of a series of protrusion portions that is a combination of a plurality of the protrusion portions serving as constituent units each protruding from the outer surface of a corresponding one of the sidewall portions by 0.8 mm or more and including a top surface with a shape depicting an alphanumeric, a pattern, or a symbol, a number of the indications being N, an angle between one end and an other end of each of the indications in the tire circumferential direction about a tire axis is equal to or greater than 30° and equal to or less than 150°, the indications are arranged in each of the sidewall portions, at an interval of $(360°/N)\pm20°$ based on the number N of the indications in one of the sidewall portions on one of the sides, and the indications in one of the sidewall portions on one side and the indications in the other one of the sidewall portions on the other side are positioned shifted from each other in the tire circumferential direction, with a shift angle, about the tire axis, between one of the indications in the sidewall portion on the one side and one of the indications in the sidewall portion on the other side that are arranged closest to each other being in a range of $(180°/N)\pm20°$ based on the number N of the indications in one of the sidewall portions on one side.

In the present technology, as described above, with the indications provided within the angle ranges described above while being arranged at an appropriate interval in the sidewall portion on one side on the basis of the number of indications, the indications can be arranged in each sidewall portion in a well balanced manner, without compromising the visibility of the indications. Furthermore, the indications, in the sidewall portions on one side and the other side, arranged closest to each other are arranged while being appropriately shifted from each other. Thus, regions with an increased rubber amount (the regions where the indications are formed) and regions with a relatively small rubber amount (regions without indication) are alternately arranged between the sidewall portions on one side and the other side. Thus, the increase/decrease in the rubber amount between the sidewall portions on both sides can offset each other, whereby the excellent uniformity can be achieved and the vibration during traveling can be suppressed.

In the present technology, a sum of overlapping amounts between the indications, in the sidewall portions on one side and the other side, arranged closest to each other is preferably equal to or less than 30°. With the overlapping amounts between the indications made small, appropriately shifted arrangement of the indications, in the sidewall portions on one and the other sides, arranged closest to each other can be achieved, which is advantageous in improving the uniformity. Note that the "overlapping amount" is represented by an angle about a tire axis defining portions of the indications, in the sidewall portions on one side and the other side, arranged closest to each other that overlap, and is 0° if the indications, in the sidewall portions on one side and the other side, arranged closest to each other do not overlap.

In the present technology, a ratio Wt/Ws between a rubber thickness Ws at a portion without the protrusion portion and a rubber thickness Wt at a portion with the protrusion portion at the center position of the indication in the tire radial direction is preferably set to be equal to or greater than 1.2 and equal to or less than 2.0. As a result, the protrusion portions protrude sufficiently from the outer surface of the tire to enhance the visibility of the indication. The difference in the rubber amount due to the presence/absence of indications (protrusion portions) can be within an appropriate range, which is advantageous for improving uniformity. Note that the rubber thicknesses Ws, Wt are each a thickness of rubber between the outer surface of the carcass layer to the corresponding outer surface (the outer surface of the sidewall portion or the apex of the protrusion portion) in the meridian cross section.

In the present technology, it is preferable that the number of the indications in one of the sidewall portions on one side is two, an angle between one end and an other end of each of the indications in the tire circumferential direction about the tire axis be equal to or greater than 50°, and a sum of the angles between the one end and the other end of each of the indications in the tire circumferential direction about the tire axis is equal to or less than 190°, and a sum of overlapping amounts between the one of the indications in the sidewall portion on the one side and the one of the indications in the sidewall portion on the other side that are arranged closest to each other is equal to or less than 20°. As a result, the balance between the number and the arrangement of the indications is further improved, which is advantageous for improving uniformity and suppressing vibration when traveling.

In the present technology, it is preferable that a length of each of the indications along the tire radial direction is equal to or more than 13% and equal to or less than 20% of a tire cross sectional height. Thus, the indications can have an appropriate size, whereby the difference in the rubber amount due to the presence/absence of indications can be within an appropriate range, with favorable visibility of the indications maintained.

DETAILED DESCRIPTION

Configurations of embodiments of the present technology will be described in detail below with reference to the accompanying drawings.

Figure 1:
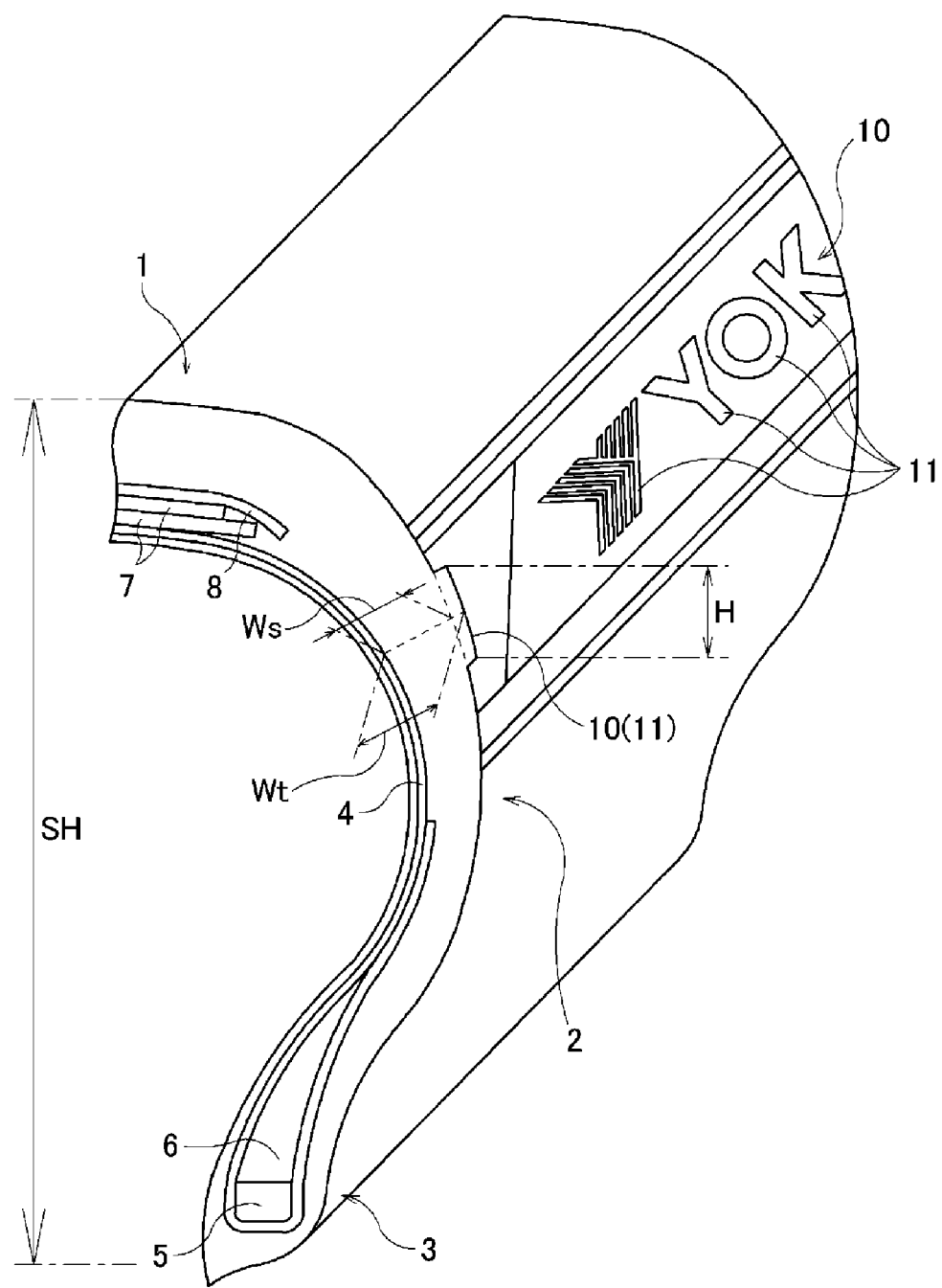
FIG. 1 is a schematic meridian cross-sectional and perspective view of a pneumatic tire according to an embodiment of the present technology.

As illustrated in FIG. 1, a pneumatic tire of an embodiment of the present technology includes a tread portion 1, a pair of sidewall portions 2 disposed on both sides of the tread portion 1, and a pair of bead portions 3 disposed in the sidewall portions 2 in an inner side in a tire radial direction. Additionally, FIG. 1 only illustrates a main part, and accordingly, although not illustrated, each of the tread portion 1, the sidewall portion 2, and the bead portions 3 extends in the tire circumferential direction to form an annular shape. Thus, the basic structure of the toroidal shape of the pneumatic tire is configured. Each of the tire components extends in the tire circumferential direction to form an annular shape.

A carcass layer 4 is mounted between the left-right pair of bead portions 3. The carcass layer 4 includes a plurality of reinforcing cords extending in the tire radial direction, and is folded back around a bead core 5 disposed in each of the bead portions 3 from a vehicle inner side to a vehicle outer side. Additionally, bead fillers 6 are disposed on the periphery of the bead cores 5, and each bead filler 6 is enveloped by a main body portion and a folded back portion of the carcass layer 4. On the other hand, in the tread portion 1, a plurality of belt layers 7 (two layers in FIG. 1) are embedded on an outer circumferential side of the carcass layer 4. The belt layers 7 each include a plurality of reinforcing cords that are inclined with respect to the tire circumferential direction, with the reinforcing cords of the different layers arranged in a criss-cross manner. In these belt layers 7, the inclination angle of the reinforcing cords with respect to the tire circumferential direction ranges from, for example, 10° to 40°. In addition, a belt reinforcing layer 8 is provided on the outer circumferential side of the belt layers 7. The belt reinforcing layer 8 includes organic fiber cords oriented in the tire circumferential direction. In the belt reinforcing layer 8, the angle of the organic fiber cords with respect to the tire circumferential direction is set, for example, to from 0° to 5°.

The present technology may be applied to such a pneumatic tire having a general cross-sectional structure; however, the basic structure is not limited to the aforementioned structure.

Figure 2:
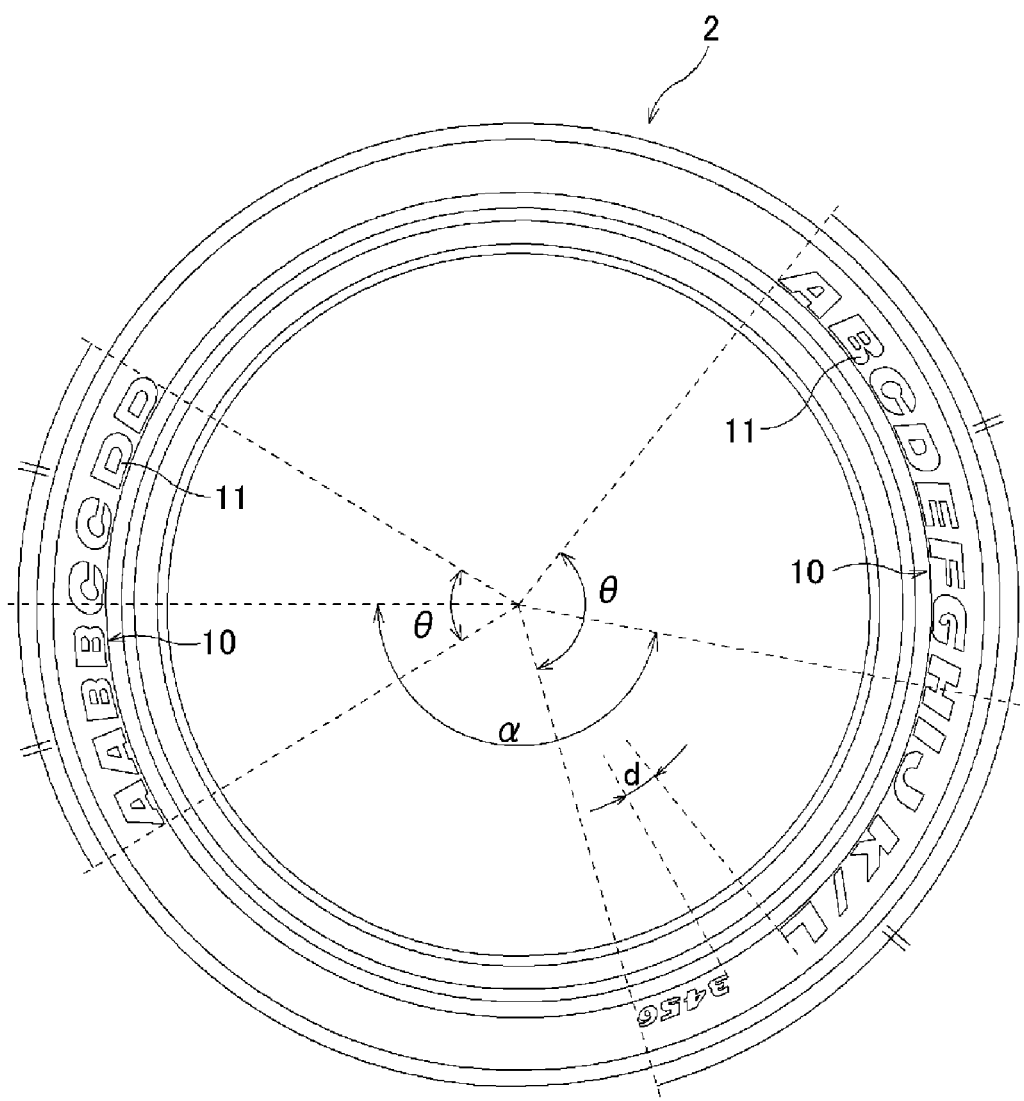
FIG. 2 is a side view of the pneumatic tire according to an embodiment of the present technology.

In an embodiment of the present technology, as illustrated in FIG. 2, the outer surface of the sidewall portion 2 is provided with N indications 10 (note that N is an integer that is equal to or greater than 1). Each of the indications 10 is formed as a group of a series of protrusion portions 11 that is a combination of a plurality of the protrusion portions 11 serving as constituent units each protruding from the outer surface of the sidewall portion 2 and including top surfaces with shapes depicting alphanumerics, patterns, and symbols. For example, in the example illustrated in FIG. 2, two indications 10 are provided. One of the indications 10 is formed as a group of a series of protrusion portions 11 as a character string "AABBCCDD" that is a combination of protrusion portions 11 depicting a character "A", protrusion portions 11 depicting a character "B", protrusion portions 11 depicting a character "C", and protrusion portions 11 depicting a character "D". The other one of the indications 10 is formed as a character string as a group of a series of protrusion portions 11 representing a character string "ABCDEFGHIJ K/L 3456" that is a combination of a protrusion portion 11 depicting a character "A", a protrusion portion 11 depicting a character "B", a protrusion portion 11 depicting a character "C", a protrusion portion 11 depicting a character "D", a protrusion portion 11 depicting a character "E", a protrusion portion 11 depicting a character "F", a protrusion portion 11 depicting a character "G", a protrusion portion 11 depicting a character "H", a protrusion portion 11 depicting a character "I", a protrusion portion 11 depicting a character "J", a protrusion portion 11 depicting character "K", a protrusion portion 11 depicting a symbol "/", a protrusion portion 11 depicting a character "L", a protrusion portion 11 depicting a number "3", a protrusion portion 11 depicting a number "4", a protrusion portion 11 depicting a number "5", and a protrusion portion 11 depicting a number "6". In the indication 10 that is "ABCDEFGHIJ K/L 3456" as the illustrated example, distances between the alphanumerics "J" and "K" and between the alphanumeric "L" and the number "3" are greater than those between other protrusion portions 11. Still, the protrusion portions 11 are regarded as a single indication 10 (a group of a series of continuous protrusion portions 11) as long as an interval d (an angle about a tire axis) is equal to or less than 10°, preferably equal to or less than 8°.

The indication 10 is provided in a region disposed on an outer side, in the tire radial direction, of the tire maximum width position of the outer surface of each of the sidewall portions 2. The protruding height of each of the protrusion portions 11 from the outer surface of the sidewall portion is equal to or greater than 0.8 mm, preferably equal to or greater than 1.2 mm. An angle θ from one end to an other end of each indication 10 in the tire circumferential direction about the tire axis is equal to or greater than 30° and equal to or less than 150°, preferably equal to or greater than 45° and equal to or less than 120°. The angles θ of the two example indications 10 illustrated in FIG. 2 are respectively an angle (approximately 65°) between end portions of the alphanumerics "A" and "D" of the character string "AABBCCDD" and an angle (approximately 105°) between end portions of the alphanumeric "A" and the number "6" of the character string "ABCDEFGHIJ K/L 3456".

Figure 3A:
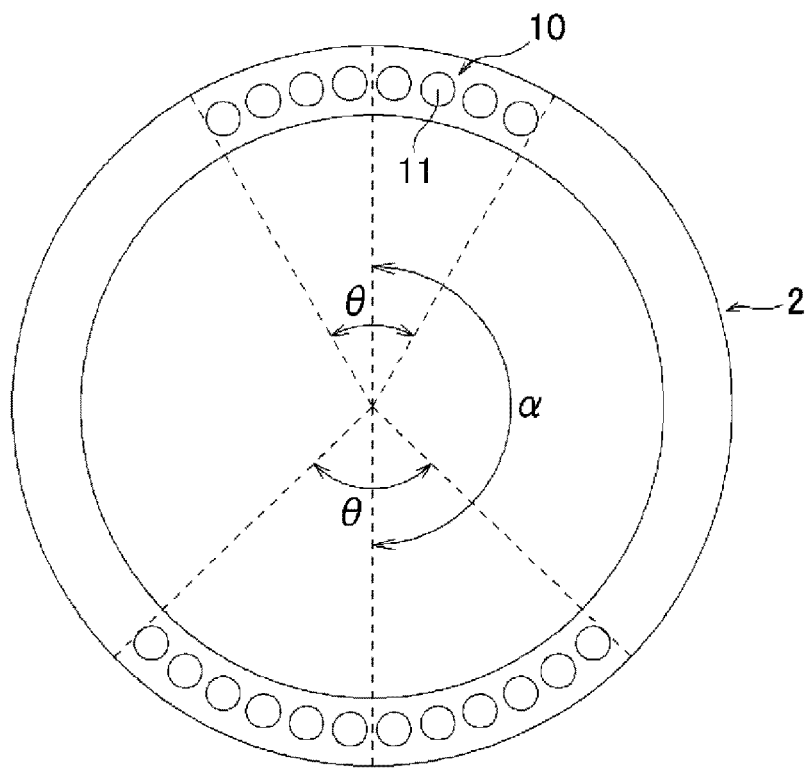
FIGS. 3A-3B are schematic views illustrating arrangements of indications.
Figure 3B:
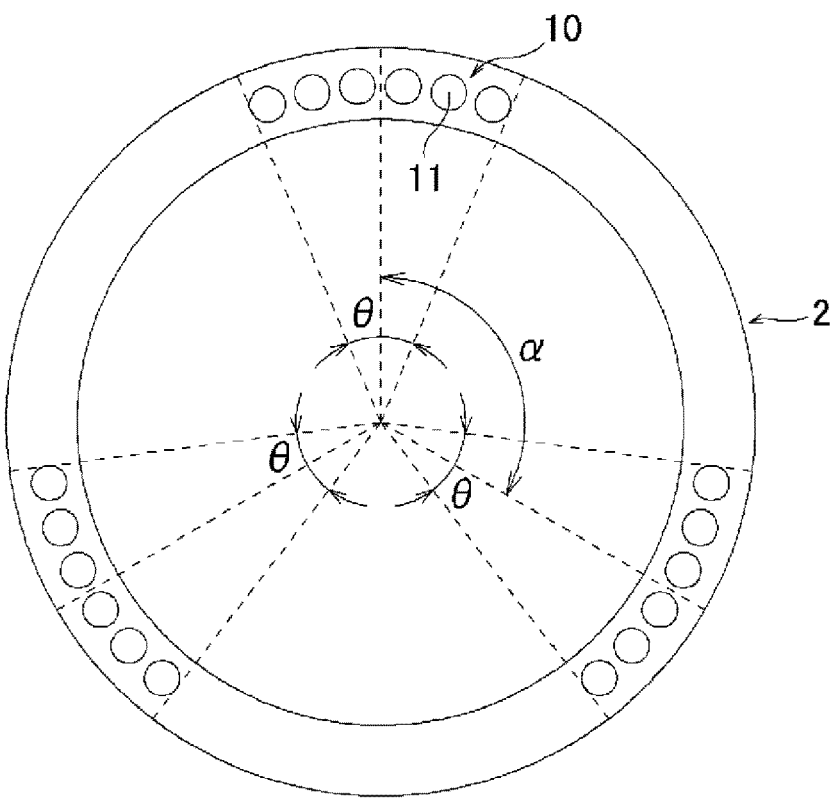

In each of the sidewall portions 2, the indications 10 are disposed at an interval of (360°/N)±20° based on the number N of indications 10. The term "interval" indicates an angle between the centers of the indications 10 in the circumferential direction about the tire axis as illustrated in FIGS. 2 and 3A-3B. Specifically, in the example illustrated in FIG. 3A, the number N of the indications 10 is two, and thus the indications 10 are arranged at an interval of 160° to 200°. In the example illustrated in FIG. 3B, the number N of indications 10 is three, and thus the indications 10 are arranged at an interval of 100° to 140°. In other words, in the example illustrated in FIG. 3A, an angle α between the centers of the indications 10 in the circumferential direction is 160° to 200°. In the example illustrated in FIG. 3B, the angle α between the centers of the indications 10 in the circumferential direction about the tire axis is 100° to 140°. Note that in FIGS. 3A-3B, each of the protrusion portions 11 included in the indications 10 are schematically illustrated with circle marks.

Figure 4A:
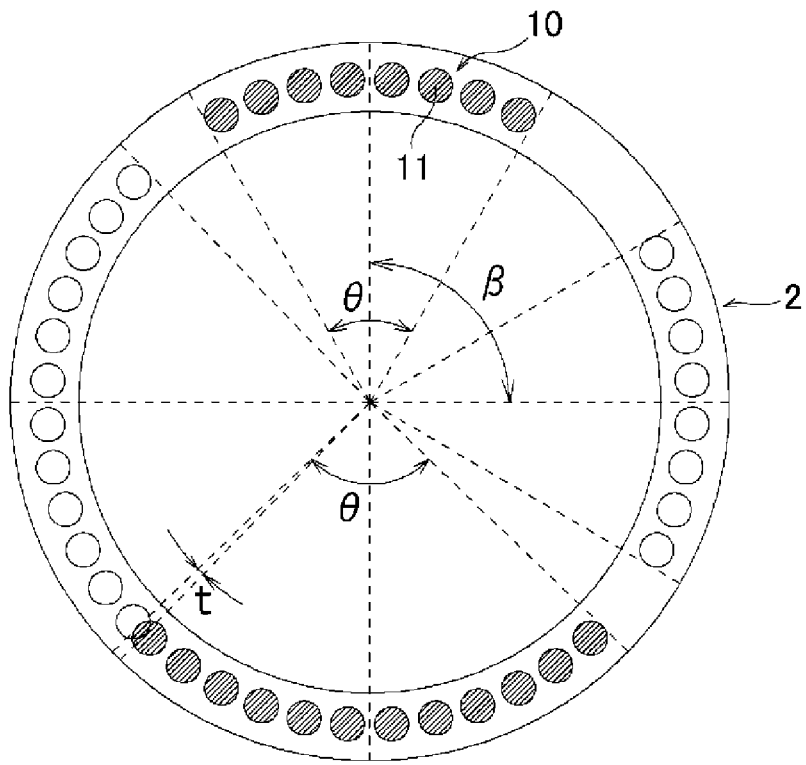
FIGS. 4A-4B are schematic views illustrating positional relationships between indications.
Figure 4B:
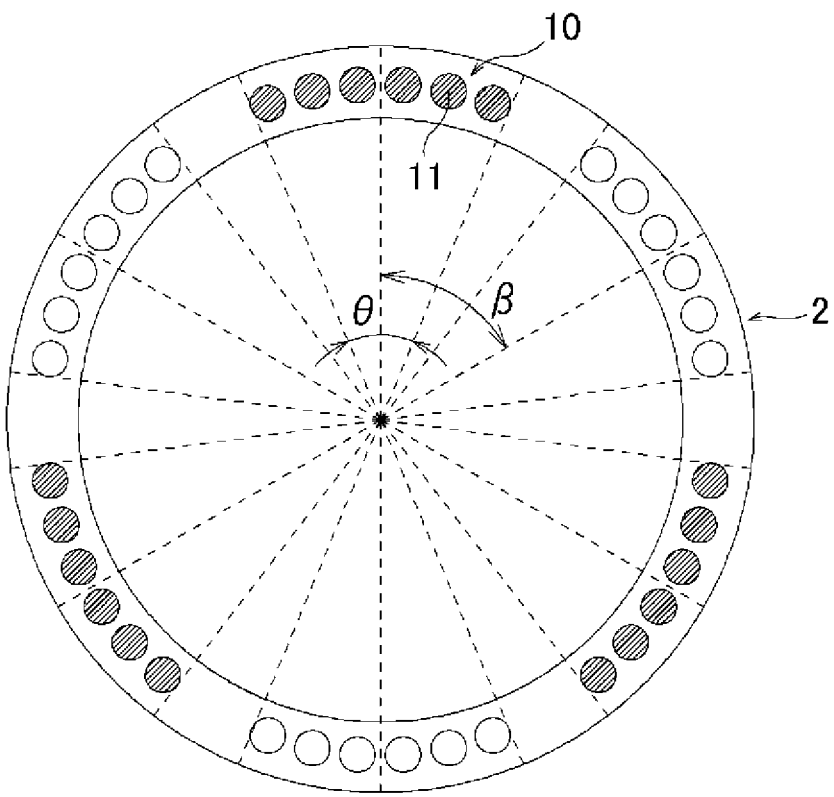

The indication 10 in the sidewall portion 2 on one side and the indication 10 in the sidewall portion 2 on the other side are arranged at positions shifted from each other in the tire circumferential direction. A shift angle about the tire axis between the indications 10, in the sidewall portions 2 on one and the other sides, arranged closest to each other is set to be within a range of (180°/N)±20° based on the number N of the indications 10. Specifically, in FIGS. 4A-4B, the sidewall portions on one and the other sides overlap each other with the indications 10 in the sidewall portions 2 on one and the other sides hatched. In both FIGS. 4A and FIG. 4B, the indications 10 on the sidewall portion 2 on one side and the display sections on the sidewall portion 2 on the other side are shifted from each other, with a shift angle β between the indications 10 (an angle, about the tire axis, between the centers of the indications 10 in the circumferential direction) being from 70° to 110° (=(180°/2)±20°) in FIG. 4A where the number N of the indications 10 is two and being from 40° to 80° (=(180°/3)±20°) in FIG. 4B where the number N of the indications 10 is three. Note that also in FIGS. 4A-4B, the individual protrusion portions 11 included in the indications 10 are schematically illustrated with circle marks.

With the indications 10 thus provided within the angle ranges described above while being arranged at an appropriate interval in the sidewall portion 2 on one side on the basis of the number of indications 10, the indications 10 can be arranged in each sidewall portion 2 in a well balanced manner, without compromising the visibility of the indications 10. Furthermore, the indications 10, in the sidewall portions 2 on one side and the other side, arranged closest to each other are arranged while being appropriately shifted from each other. Thus, portions with an increased rubber amount (the regions with the indications 10) and portions with a relatively small rubber amount (regions with no indication 10) are alternately arranged between the sidewall portions 2 on one side and the other side. Thus, the increase/decrease in the rubber amount can be offset between the sidewall portions 2 on both sides, whereby the excellent uniformity can be achieved and the vibration during traveling can be suppressed.

The protruding height of each of the protrusion portions 11 that is less than 0.8 mm results in insufficient protrusion of the individual protrusion portions 11 (such as alphanumerics), compromising the visibility of the indication 10. On the other hand, even with a larger protruding height of each protrusion portion 11, the uniformity can be favorably maintained, because the increase/decrease in the rubber amount can be offset between sidewall portions 2 on both sides, with the regions, in the sidewall portions on one side and the other side, with and without the indication 10 alternately arranged. Still, an excessively large height of each of the protrusion portions 11 results in a low durability of each protrusion portion 11. Thus, the protruding height of the protrusion portion 11 is preferably equal to or less than 2.0 mm, more preferably equal to or less than 1.8 mm.

The indications 10 are provided in the regions disposed on an outer side, in the tire radial direction, of the tire maximum width positions of the outer surfaces of the sidewall portions 2. These regions are separated from other reinforcing materials (such as the bead filler 6 and the belt layer 7) and only include the rubber layer forming the carcass layers 4 and the sidewall portions 2. Furthermore, the regions are portions with the smallest rubber thickness in the tire. Thus, the regions are largely affected by the change in the rubber amount due to the indication 10. Thus, the structure described above is effectively employed for improving the uniformity and suppressing the vibration during traveling.

When the angle θ of each of the indications 10 is less than 30°, the indication 10 is small and thus the visibility of the indication 10 is low. When the angle θ of each of the indications 10 exceeds 150°, the end portions of the indications 10 may overlap even when the indications 10 in the sidewall portions 2 on one side and the other side are shifted from each other in the tire circumferential direction. As a result, a uniformity improvement effect cannot be sufficiently obtained. When the interval between the indications 10 in each sidewall portion 2 does not satisfy the relationship (360°/N)±20°, the indications 10 are arranged in each sidewall portion 2 in an unbalanced manner. Thus, a sufficient uniformity improvement effect cannot be achieved. When the shift angle between the indications 10 does not satisfy the relationship (180°/N)±20°, the indications 10 cannot be arranged while being appropriately shifted from each other. Thus, a sufficient uniformity improvement effect cannot be achieved.

Figure 5:
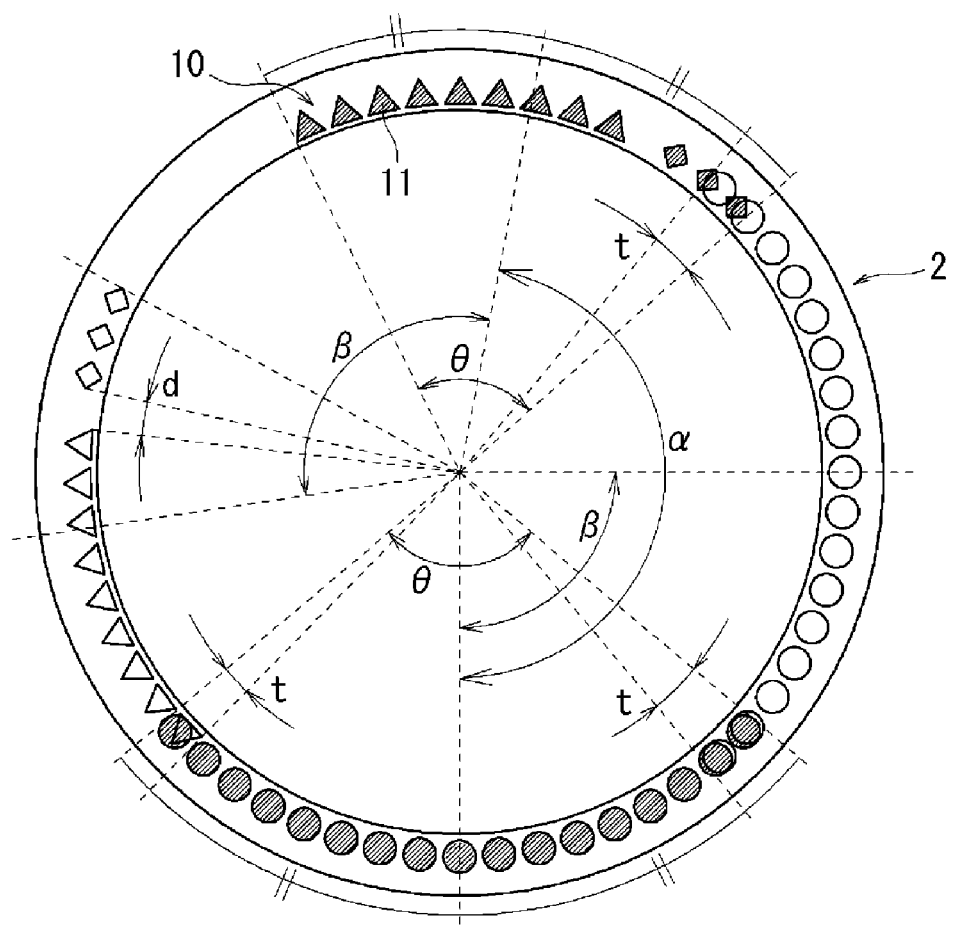
FIG. 5 is a schematic view illustrating a positional relationship between indications.

An embodiment of the present technology features the shifted arrangement of the indications 10, in the sidewall portions 2 on one side and the other side, arranged closest to each other. However, partial overlap of these indications 10 is tolerated. In other words, a sum T of overlapping amounts t between the indications 10, in the sidewall portions 2 on one side and the other side, arranged closest to each other is preferably equal to or less than 30°. In the example illustrated in FIG. 5, two indications 10 (two types of indications 10 including an indication 10 abbreviated with circle marks and an indication 10 abbreviated with triangle and rectangle marks) are provided in each of the sidewall portions 2, with three overlapping portions between the indications 10 on the sidewall portions on one side and the other sides. In such a case, the sum T of the overlapping amounts t does not exceed 30°. With the overlapping amounts t between the indications 10 thus made small, appropriately shifted arrangement of the indications 10, in the sidewall portions 2 on one and the other sides, arranged closest to each other can be achieved, which is advantageous in improving the uniformity. Note that, as illustrated in the figure, the overlapping amount t is an angle between a straight line connecting one end of the indication 10 in the sidewall portions 2 on one side in the tire circumferential direction and the tire axis center and a straight line connecting the other end of the indication 10 in the sidewall portion 2 on the other side in the tire circumferential direction and the tire axis center.

The number N of the indications 10 is not particularly limited, but is preferably one to three, considering the number of protrusion portions 11 (number of alphanumerics) included in the indication 10 (a character string such as a manufacturer logo, a model name, or a product name) employed as the indication 10 on the pneumatic tire and the visibility of each of the indications 10. In particular, tires that are generally available on market have two indications 10 (product model name and manufacturer logo) in many cases. As described above, when the number N of indications 10 is two, the angle between one and an other end of each indication 10 in the tire circumferential direction is preferably equal to or greater than 50°, a sum of the angles between the one end and the other end of each of the indications in the tire circumferential direction about the tire axis is preferably equal to or less than 190°, and the sum of the overlapping amounts between the indications 10, in the sidewall portions on one and the other sides, arranged closest to each other is preferably equal to or less than 20°. When the structure described above is employed with the number N of indications 10 being two, optimum balance between the number of indications 10 and the arrangement thereof can be achieved, which is advantageous in improvement of uniformity and suppression of vibration during traveling.

The protruding height of the protrusion portions 11 forming the indication 10 as described above, is preferably set on the basis of the balance between the rubber gauge of the sidewall portion 2 and the rubber amount increasing due to the indication 10. Specifically, a ratio Wt/Ws between a rubber thickness Ws at a portion without the protrusion portion 11 and a rubber thickness Wt at a portion with the protrusion portion 11 at the center position of the indication 10 in the tire radial direction is preferably set to be equal to or greater than 1.2 and equal to or less than 2.0, more preferably equal to or greater than 1.3 and equal to or less than 1.7. Thus, the protrusion portions 11 protrude sufficiently from the tire outer surface, whereby visibility of the indication 10 can be improved. Furthermore, the difference in the rubber amount due to the presence/absence of the indication 10 (protrusion portion 11) can be within an appropriate range, which is advantageous in improving uniformity. When the ratio Wt/Ws is lower than 1.2, the rubber amount increased due to the indication 10 from the rubber amount at the portion without the indication 10 is sufficiently small, whereby the impact of the indication 10 on uniformity can be at a negligible level. The rubber thicknesses Ws and Wt may be any value satisfying the relationship described above. Still, the rubber thickness Ws is preferably 2.0 mm to 4.0 mm, more preferably 2.5 mm to 3.5 mm.

A larger indication 10 offers higher visibility, but also imposes a large impact on uniformity. In view of this, a length H of the indication 10 along the tire radial direction is preferably equal to or more than 13% and equal to or less than 20% of a tire cross sectional height SH. Thus, the indication 10 can have an appropriate size, whereby the difference in the rubber amount due to the presence/absence of the indication 10 can be within an appropriate range, with favorable visibility of the indication 10 maintained. When the length H is less than 13% of the cross sectional height SH, the visibility is compromised. When the length H exceeds 20% of the cross sectional height SH, the indication 10 is too large, and imposes a large impact on uniformity.

In the pneumatic tire, the indication 10 may take various forms, and thus various settings described above can be appropriately combined in accordance with the shape of the indication 10. In any cases, in tires employing various settings described above, increase/reduction in the rubber amount due to the presence and absence of the indication 10 can be offset between a pair of sidewall portions, whereby excellent uniformity can be achieved and the vibration during traveling can be suppressed.

EXAMPLE

A total of 28 types of pneumatic tires according to Conventional Examples 1 and 2, Comparative Examples 1 to 8, and Examples 1 to 18 were manufactured with the tire size of 225/65R17 102V, and with the basic structure illustrated in FIG. 1 as an example. The protruding height of each indication provided on the outer surface of the sidewall portion, the angle θ between one end and the other end in the tire circumferential direction about the tire axis, the ratio (H/SH×100%) of the length H along the tire circumferential direction to the tire cross sectional height SH, the interval a between the indications, the shift angle β between the indications in the sidewall portions on one and the other sides in the tire circumferential direction, the sum T of the overlapping amounts t of the indications in the sidewall portions on one and the other sides in the tire circumferential direction, and the ratio Wt/Ws between the rubber thickness Ws at a portion without the protrusion portion and the rubber thickness Wt at the portion with the protrusion portion for these pneumatic tires were set as in Tables 1 and 2.

Vibration performance and display visibility of the pneumatic tires were evaluated by the following evaluation methods. The results are also indicated in Tables 1 and 2.

Vibration Performance

Each test tire was mounted on a wheel having a rim size of 17×61/2J, inflated to an air pressure of 230 kPa, and mounted on a test vehicle. Each test tire was subjected to a sensory evaluation for vibration during straight forward traveling by test drivers on a paved road surface. In Table 1, evaluation results are expressed as index values with Conventional Example 1 being assigned the index value of 100. In Table 2, evaluation results are expressed as index values with Conventional Example 2 being assigned the index value of 100. Larger index values indicate smaller vibration during traveling and thus indicates superior vibration performance. Note that an index value that is equal to or smaller than "102" indicates a failure to achieve sufficient improvement effect from Conventional Examples. In other words, such a value indicates that the performance that is substantially the same as that in Conventional Examples is obtained.

Visibility

Visibility of the indication on each test tire was determined by 10 panelists through visual inspection based on the following criteria. A sum of evaluation values is obtained based on the following criteria, and in Table 1, evaluation results are expressed as index values with Conventional Example 1 being assigned the index value of 100. In Table 2, evaluation results are expressed as index values with Conventional Example 2 being assigned the index value of 100. Larger index values indicate superior visibility. An index value that is equal to or larger than "98" indicates that sufficiently favorable visibility is achieved.

Determination Criteria

4: Each of the constituent units (alphanumerics) of the indication was clearly recognizable.

3: Some of the constituent units (alphanumerics) of the indication were unclear, but the indication (the entire character string) as a whole seemed clear.

2: The constituent units (alphanumerics) of the indication were difficult to individually recognize, but the indication (the entire character string) as a whole was recognizable.

1: The indication as a whole seemed unclear.

TABLE 1

|  |  |  | Conventional Example 1 | Comparative Example 1 | Comparative Example 2 |
|---|---|---|---|---|---|
| Indication 1 | Protruding height | mm | 2.2 | 0.5 | 2.2 |
|  | Angle θ | ° | 60 | 60 | 20 |
|  | H/SH × 100 | % | 21 | 21 | 21 |
| Indication 2 | Protruding height | mm | 2.2 | 0.5 | 2.2 |
|  | Angle θ | ° | 60 | 60 | 160 |
|  | H/SH × 100 | % | 21 | 21 | 21 |
| Indication 3 | Protruding height | mm | 2.2 | 0.5 | 2.2 |
|  | Angle θ | ° | 60 | 60 | 60 |
|  | H/SH × 100 | % | 21 | 21 | 21 |
| Indication Interval α |  | ° | 120 | 120 | 120 |
| Shift angle β |  | ° | 0 | 0 | 0 |
| Sum T of overlapping amounts |  | ° | 180 | 180 | 120 |
| Ratio Wt/Ws |  |  | 1.7 | 1.2 | 1.7 |
| Vibration performance |  | Index value | 100 | 105 | 102 |
| Visibility |  | Index value | 100 | 95 | 95 |

|  |  |  | Example 1 | Comparative Example 3 | Example 2 | Example 3 |
|---|---|---|---|---|---|---|
| Indication 1 | Protruding height | mm | 2.2 | 2.2 | 2.2 | 2.2 |
|  | Angle θ | ° | 60 | 60 | 60 | 60 |
|  | H/SH × 100 | % | 21 | 21 | 21 | 21 |
| Indication 2 | Protruding height | mm | 2.2 | 2.2 | 2.2 | 2.2 |
|  | Angle θ | ° | 60 | 60 | 60 | 60 |
|  | H/SH × 100 | % | 21 | 21 | 21 | 21 |
| Indication 3 | Protruding height | mm | 2.2 | 2.2 | 2.2 | 2.2 |
|  | Angle θ | ° | 60 | 60 | 60 | 60 |
|  | H/SH × 100 | % | 21 | 21 | 21 | 21 |
| Indication Interval α |  | ° | 120 | 120 | 120 | 120 |
| Shift angle β |  | ° | 60 | 35 | 40 | 80 |
| Sum T of overlapping amounts |  | ° | 0 | 75 | 60 | 60 |
| Ratio Wt/Ws |  |  | 2.1 | 2.1 | 2.1 | 2.1 |
| Vibration performance |  | Index value | 110 | 102 | 105 | 105 |
| Visibility |  | Index value | 100 | 100 | 100 | 100 |

|  |  |  | Comparative Example 4 | Example 4 | Example 5 |
|---|---|---|---|---|---|
| Indication 1 | Protruding height | mm | 2.2 | 0.8 | 1.2 |
|  | Angle θ | ° | 60 | 60 | 60 |
|  | H/SH × 100 | % | 21 | 21 | 21 |
| Indication 2 | Protruding height | mm | 2.2 | 0.8 | 1.2 |
|  | Angle θ | ° | 60 | 60 | 60 |
|  | H/SH × 100 | % | 21 | 21 | 21 |
| Indication 3 | Protruding height | mm | 2.2 | 0.8 | 1.2 |
|  | Angle θ | ° | 60 | 60 | 60 |
|  | H/SH × 100 | % | 21 | 21 | 21 |
| Indication Interval α |  | ° | 120 | 120 | 120 |
| Shift angle β |  | ° | 85 | 60 | 60 |
| Sum T of overlapping amounts |  | ° | 75 | 0 | 0 |
| Ratio Wt/Ws |  |  | 2.1 | 1.2 | 1.4 |
| Vibration performance |  | Index value | 102 | 120 | 115 |
| Visibility |  | Index value | 100 | 98 | 100 |

|  |  |  | Example 6 | Example 7 | Example 8 | Example 9 |
|---|---|---|---|---|---|---|
| Indication 1 | Protruding height | mm | 3 | 1.2 | 1.2 | 1.2 |
|  | Angle θ | ° | 60 | 60 | 60 | 60 |
|  | H/SH × 100 | % | 21 | 13 | 18 | 20 |
| Indication 2 | Protruding height | mm | 3 | 1.2 | 1.2 | 1.2 |
|  | Angle θ | ° | 60 | 60 | 60 | 60 |
|  | H/SH × 100 | % | 21 | 13 | 18 | 20 |
| Indication 3 | Protruding height | mm | 3 | 2.2 | 2.2 | 2.2 |
|  | Angle θ | ° | 60 | 60 | 60 | 60 |
|  | H/SH × 100 | % | 21 | 13 | 18 | 20 |
| Indication Interval α |  | ° | 120 | 120 | 120 | 120 |
| Shift angle β |  | ° | 60 | 60 | 60 | 60 |
| Sum T of overlapping amounts |  | ° | 0 | 0 | 0 | 0 |
| Ratio Wt/Ws |  |  | 2.0 | 1.4 | 1.4 | 1.4 |
| Vibration performance |  | Index value | 105 | 120 | 117 | 116 |
| Visibility |  | Index value | 105 | 98 | 99 | 100 |

TABLE 2

| | | | Conventional Example 2 | Comparative Example 5 | Comparative Example 6 |
|---|---|---|---|---|---|
| Indication 1 | Protruding height | mm | 2.2 | 0.5 | 2.2 |
| | Angle θ | ° | 60 | 60 | 20 |
| | H/SH × 100 | % | 21 | 21 | 21 |
| Indication 2 | Protruding height | mm | 2.2 | 0.5 | 2.2 |
| | Angle θ | ° | 100 | 100 | 160 |
| | H/SH × 100 | % | 21 | 21 | 21 |
| Indication 3 | Protruding height | mm | — | — | — |
| | Angle θ | ° | — | — | — |
| | H/SH × 100 | % | — | — | — |
| Indication Interval α | | ° | 180 | 180 | 180 |
| Shift angle β | | ° | 0 | 0 | 0 |
| Sum T of overlapping amounts | | ° | 120 | 120 | 40 |
| Ratio Wt/Ws | | | 1.7 | 1.7 | 1.7 |
| Vibration performance | | Index value | 100 | 102 | 101 |
| Visibility | | Index value | 102 | 97 | 97 |

| | | | Example 10 | Comparative Example 7 | Example 11 | Example 12 |
|---|---|---|---|---|---|---|
| Indication 1 | Protruding height | mm | 2.2 | 2.2 | 2.2 | 2.2 |
| | Angle θ | ° | 60 | 60 | 60 | 60 |
| | H/SH × 100 | % | 21 | 21 | 21 | 21 |
| Indication 2 | Protruding height | mm | 2.2 | 2.2 | 2.2 | 2.2 |
| | Angle θ | ° | 60 | 60 | 60 | 60 |
| | H/SH × 100 | % | 21 | 21 | 21 | 21 |
| Indication 3 | Protruding height | mm | — | — | — | — |
| | Angle θ | ° | — | — | — | — |
| | H/SH × 100 | % | — | — | — | — |
| Indication Interval α | | ° | 180 | 180 | 180 | 180 |
| Shift angle β | | ° | 90 | 65 | 70 | 110 |
| Sum T of overlapping amounts | | ° | 0 | 0 | 0 | 0 |
| Ratio Wt/Ws | | | 2.1 | 2.1 | 2.1 | 2.1 |
| Vibration performance | | Index value | 105 | 102 | 103 | 103 |
| Visibility | | Index value | 102 | 102 | 102 | 102 |

| | | | Comparative Example 8 | Example 13 | Example 14 |
|---|---|---|---|---|---|
| Indication 1 | Protruding height | mm | 2.2 | 0.8 | 1.2 |
| | Angle θ | ° | 60 | 60 | 60 |
| | H/SH × 100 | % | 21 | 21 | 21 |
| Indication 2 | Protruding height | mm | 2.2 | 0.8 | 1.2 |
| | Angle θ | ° | 60 | 60 | 60 |
| | H/SH × 100 | % | 21 | 21 | 21 |
| Indication 3 | Protruding height | mm | — | — | — |
| | Angle θ | ° | — | — | — |
| | H/SH × 100 | % | — | — | — |
| Indication Interval α | | ° | 180 | 180 | 180 |
| Shift angle β | | ° | 115 | 90 | 90 |
| Sum T of overlapping amounts | | ° | 0 | 0 | 0 |
| Ratio Wt/Ws | | | 2.1 | 1.2 | 1.4 |
| Vibration performance | | Index value | 102 | 115 | 112 |
| Visibility | | Index value | 102 | 102 | 102 |

| | | | Example 15 | Example 16 | Example 17 | Example 18 |
|---|---|---|---|---|---|---|
| Indication 1 | Protruding height | mm | 3 | 1.2 | 1.2 | 1.2 |
| | Angle θ | ° | 60 | 60 | 60 | 60 |
| | H/SH × 100 | % | 21 | 13 | 18 | 20 |
| Indication 2 | Protruding height | mm | 3 | 1.2 | 1.2 | 1.2 |
| | Angle θ | ° | 60 | 60 | 60 | 60 |
| | H/SH × 100 | % | 21 | 13 | 18 | 20 |
| Indication 3 | Protruding height | mm | — | — | — | — |
| | Angle θ | ° | — | — | — | — |
| | H/SH × 100 | % | — | — | — | — |
| Indication Interval α | | ° | 180 | 180 | 180 | 180 |
| Shift angle β | | ° | 90 | 90 | 90 | 90 |
| Sum T of overlapping amounts | | ° | 0 | 0 | 0 | 0 |
| Ratio Wt/Ws | | | 2.0 | 1.4 | 1.4 | 1.4 |
| Vibration performance | | Index value | 103 | 118 | 115 | 112 |
| Visibility | | Index value | 107 | 100 | 99 | 102 |

Tables 1 and 2 clearly indicate that each of Examples 1 to 18 has improved vibration performance with the visibility favorably maintained or improved, compared with Conventional Examples 1 and 2 as references. Note that the vibration performance during straight forward traveling is largely affected by tire uniformity. Thus, each of Examples 1 to 18 with the improved vibration performance can be regarded as having excellent uniformity.

On the other hand, Comparative Examples 1 and 5 resulted in compromised visibility due to a small protruding height of the indication. Comparative Examples 2 and 6 resulted in a failure to achieve an effect of improving the vibration performance and in compromised visibility since indications with excessively large and small angles θ were included. Comparative Examples 3 and 7 resulted in a failure to achieve an effect of sufficiently improving the vibration performance due to an excessively small shift angle. Comparative Examples 4 and 8 resulted in a failure to achieve an improvement effect of sufficiently improving the vibration performance due to an excessively large shift angle. A comparison between a case where the number of indications are three (Conventional Example 1, Comparative Examples 1 to 4, and Examples 1 to 9) and a case where the number of indications are two (Conventional Example 2, Comparative Examples 5 to 8, and Examples 10 to 18) indicates the fact that the visibility is better in the case where the number of indications is two because each indication can have a favorable size in such a case.

The invention claimed is:

1. A pneumatic tire, comprising:
a tread portion extending in a tire circumferential direction to form an annular shape;
a pair of sidewall portions provided on both sides of the tread portion; and
a pair of bead portions provided on an inner side of the sidewall portions in a tire radial direction,
regions disposed on an outer side, in the tire radial direction, of tire maximum width positions of outer surfaces of the pair of sidewall portions being provided with indications each formed as a group of a series of protrusion portions that is a combination of a plurality of the protrusion portions serving as constituent units each protruding from the outer surface of a corresponding one of the sidewall portions by 0.8 mm or more and comprising a top surface with a shape depicting an alphanumeric, a pattern, or a symbol, a number of the indications being N,
an angle between one end and an other end of each of the indications in the tire circumferential direction about a tire axis being equal to or greater than 30° and equal to or less than 150°,
the indications being arranged in each of the sidewall portions, at an interval of (360°/N) ±20° based on the number N of the indications in one of the sidewall portions on one of the sides, and
the indications in one of the sidewall portions on one side and the indications in the other one of the sidewall portions on an other side being positioned shifted from each other in the tire circumferential direction, with a shift angle, about the tire axis, between one of the indications in the sidewall portion on the one side and one of the indications in the sidewall portion on the other side that are arranged closest to each other being in a range of (180°/N) ±20° based on the number N of the indications in one of the sidewall portions on one side.

2. The pneumatic tire according to claim 1, wherein a sum of overlapping amounts between the indications in the sidewall portion on the one side and the indications in the sidewall portion on the other side that are arranged closest to each other is equal to or less than 30°.

3. The pneumatic tire according to claim 1, wherein a ratio Wt/Ws, at a center position of each of the indications in the tire radial direction, between a rubber thickness Ws at a portion without the protrusion portion and a rubber thickness Wt at a portion with the protrusion portion is equal to or greater than 1.2 and equal to or less than 2.0.

4. The pneumatic tire according to claim 1, wherein
the number of the indications in one of the sidewall portions on one side is two,
an angle between one end and an other end of each of the indications in the tire circumferential direction about the tire axis is equal to or greater than 50°, and a sum of the angles between the one end and the other end of each of the indications in the tire circumferential direction about the tire axis is equal to or less than 190°, and
a sum of overlapping amounts between the indications in the sidewall portion on the one side and the indications in the sidewall portion on the other side that are arranged closest to each other is equal to or less than 20°.

5. The pneumatic tire according to claim 1, wherein a length of each of the indications along the tire radial direction is equal to or more than 13% and equal to or less than 20% of a tire cross sectional height.

6. The pneumatic tire according to claim 2, wherein a ratio Wt/Ws, at a center position of each of the indications in the tire radial direction, between a rubber thickness Ws at a portion without the protrusion portion and a rubber thickness Wt at a portion with the protrusion portion is equal to or greater than 1.2 and equal to or less than 2.0.

7. The pneumatic tire according to claim 6, wherein
the number of the indications in one of the sidewall portions on one side is two,
an angle between one end and an other end of each of the indications in the tire circumferential direction about the tire axis is equal to or greater than 50°, and a sum of the angles between the one end and the other end of each of the indications in the tire circumferential direction about the tire axis is equal to or less than 190°, and
a sum of overlapping amounts between the indications in the sidewall portion on the one side and the indications in the sidewall portion on the other side that are arranged closest to each other is equal to or less than 20°.

8. The pneumatic tire according to claim 7, wherein a length of each of the indications along the tire radial direction is equal to or more than 13% and equal to or less than 20% of a tire cross sectional height.

* * * * *